Sept. 29, 1970  R. J. ROSA  3,531,665
COAL PREHEATING SYSTEM FOR MAGNETOHYDRODYNAMIC DEVICES
Filed June 17, 1968
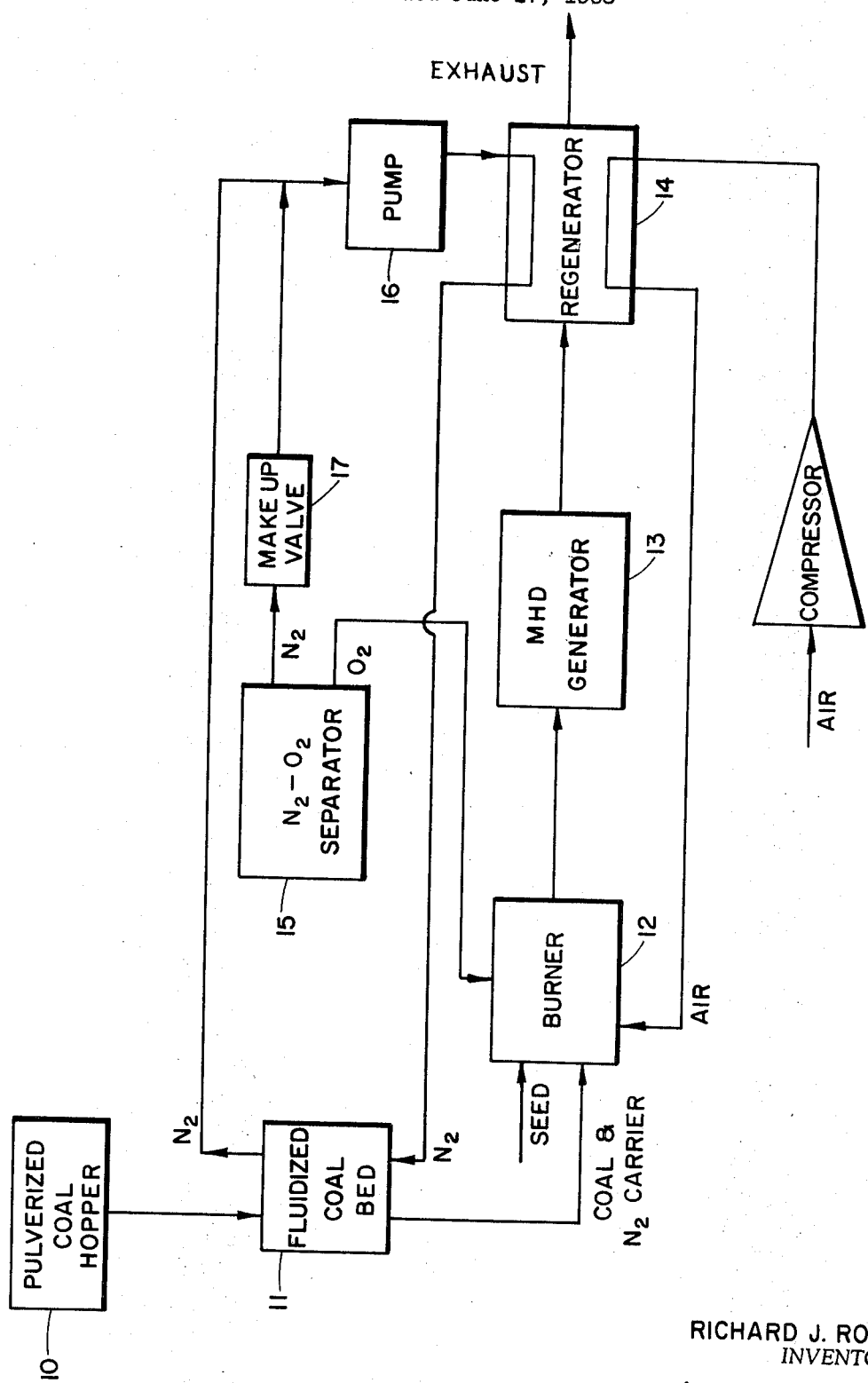
RICHARD J. ROSA
INVENTOR.
BY Charles M. Hogan
Melvin E. Frederick
ATTORNEYS United States Patent Office 3,531,665
Patented Sept. 29, 1970

3,531,665
COAL PREHEATING SYSTEM FOR MAGNETO-
HYDRODYNAMIC DEVICES
Richard J. Rosa, Reading, Mass., assignor to Avco Corporation, Cincinnati, Ohio, a corporation of Delaware
Filed June 17, 1968, Ser. No. 737,703
Int. Cl. H02n 4/02
U.S. Cl. 310—11       4 Claims

ABSTRACT OF THE DISCLOSURE

A coal preheating system for magnetohydrodynamic devices is described which includes a separation plant for providing oxygen ($O_2$) and nitrogen ($N_2$). The $N_2$ is used as a heat transfer medium to preheat coal contained in a fluidized or loosely packed coal bed and as a carrier to transfer the preheated coal to a burner or combustion chamber. The $O_2$ is also supplied to the burner for achievement of maximum possible flame temperatures.

---

The present invention relates generally to the combustion of coal for magnetohydrodynamic (hereinafter abbreviated "MHD") devices and more particularly to preheating pulverized coal for combustion in MHD devices.

In general terms, MHD devices such as generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; the gas may be products of combustion, or may comprise inert gases, such as helium or argon. In open systems, i.e., those in which the gases are not recycled after passing through the power plant, products of combustion are normally used. In closed systems, in which the gases are recycled, it is feasible to use relatively expensive gases, such as helium and argon. To promote electrical conductivity, the gases are heated to a high temperature; conductivity is also increased by the addition to the gases of a substance that ionizes readily at the operating temperature of the generator. Regardless of the gas used, it comprises a mixture of electrons, positive ions and neutral atoms which, for convenience, may be termed "plasma."

The temperature of the plasma is highly significant, not only to the overall efficiency of the system, but also to the design of the MHD generator. With a higher temperature available at the inlet of the generator, a larger isentropic drop can be developed as the plasma expands through the generator, resulting in improved plant efficiency. Further, since the electrical conductivity of the plasma increases greatly as temperature increases, it is possible to generate a given amount of power in a relatively smaller generator and employ a smaller magnetic field than would otherwise be possible. The increased efficiency of the system, considerably above that of conventional steam turbine power plants, and the absence of hot moving parts in the generator suggests that, in time, MHD power plants of the type generally disclosed in U.S. Pat. No. 3,264,501, issued Aug. 2, 1966, and entitled "Magnetohydrodynamic Power Plant" to which reference is made, will replace power generating systems of conventional design.

Combustion products from burning natural gas, oil or coal do not ionize until extremely high temperatures are reached. However, as previously noted, if a small amount of a material which ionizes more easily, such as an alkali, is added to the gas, sufficient ionization can be achieved at temperatures which feasibly can be produced in combustion chambers. For a plasma consisting essentially of combustion products, combustion temperatures in excess of 4000° F. are required for good performance. The impurity added is called seed; and the process, seeding. In practice, seeding is done by adding an alkali salt to the plasma rather than the more expensive pure metal.

To date, potassium has been selected as seed for economic reasons. The least expensive potassium salt, KCl, is not considered suitable as seed because the chlorine atom is strongly electronegative and captures the electrons given off by the potassium. It is therefore necessary to use a more expensive salt, such as for example potassium carbonate, potassium sulfate, or potassium hydroxide, as seed.

The amount of potassium carbonate, potassium sulfate, potassium hydroxide and the like required to obtain sufficient conductivity of the plasma in a coal fired generator will be of the order of 2–10% of the fuel weight. This corresponds to a seed concentration of about 0.1–0.3% by volume after combustion. The aforementioned amount of seed required is about ten times or more the amount of the potassium commonly present in coal ash and of course in a natural gas fired MHD generator the natural gas per se will not contain seed. Accordingly, seed must be added to the combustion products of coal, oil, natural gas and the like.

For a more thorough discussion of conductivity and the provision of a suitable plasma for MHD generators as by oxygen enrichment or preheating, reference is made to the aforementioned Pat. No. 3,264,501; however, for present purposes, suffice it to say that conductivity is a very strong function of the gas temperature and gas conductivity of more than about one mho per meter is required, corresponding to peak gas temperatures in excess of 4000° F.

The use of seed is required in the operation of MHD generating systems and the seed chemicals are expensive and must be recovered for economic operation of MHD electrical generating plants. Because the efficiency of an MHD generating plant is inherently higher than that of conventional steam generating plants, the cost of net power generated may be expected to be less than that for steam generating plants. However, without seed recovery in an MHD plant, the cost of fuel plus seed exceeds the cost of fuel for a comparable steam generating plant. On the basis of cost per kilowatt hour, the cost of fuel and seed decreases linearly from an amount substantially in excess of the cost of fuel for steam generating plants for zero percent recovery of seed to an amount substantially less than that for steam generating plants for high percentages of recovery. For a further discussion of seed recovery, reference is made to patent application Ser. No. 315,846, filed Oct. 14, 1963.

As will now be evident, in order to attain sufficiently high flame temperatures so that combustion products can be used as a plasma in an MHD generator, combustion air must be enriched with oxygen and/or preheated to relatively high temperatures. Further, the combustion products must be seeded and it is very helpful to preheat the fuel as well as the air.

As has already been mentioned, the gas conductivity is a very strong function of temperature and combustion temperatures in excess of 4000° F. is required in order to use combustion products as a working fluid in an MHD generator. Since a combustion temperature of only about 3000° F. can be attained by combustion of fossil fuel with air supplied at room temperature, this means that the air must be preheated to relatively high temperatures before combustion in an MHD system.

In accordance with the invention, as high as possible regenerative preheat of the fuel is provided to give the highest possible net overall efficiency with the best utilization of the fuel and plant equipment.

However, preheat temperatures are limited by the availability and costs of high temperature materials, together with the feasibility of operating with seed impurities in the combustion gases, as well as recovery of the seed. The application of conventional tubular metal heat exchangers is in practice limited to about 1000–1500° F. due to corrosion problems and excessive costs of high temperature alloys.

The problems of a preheat system can be partially alleviated by the use of storage-type regenerative heaters, such as for example pebble bed heaters, because of their capability of operating at temperatures substantially in excess of 1500° F. Such storage-type heaters generally employ a refractory material as the heat bed matrix and heat transferring medium between hot combustion products and combustion air and for this reason are capable of preheating air to much higher temperatures than that possible with tubular metal heat exchangers. Such heaters have been used in other processes to preheat air with hot combustion gases to temperatures as high as 4000° F.

For a more thorough discussion of preheating air, reference is made to patent application Ser. No. 546,721, filed May 2, 1966, and for a more thorough discussion of preheating pulverized coal mixed with air, reference is made to Pat. No. 3,250,236, issued May 10, 1966.

In view of the foregoing discussion, it will be apparent that it is an object of the present invention to provide apparatus for heating pulverized or loosely packed coal for MHD devices.

It is another object of the present invention to provide a high temperature regenerative coal preheater system for MHD power plants.

A still further object of the present invention is the provision of apparatus for preheating to high temperatures pulverized coal for MHD power plants, thereby resulting in more efficient and economical operation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing which is a block diagram illustrating an open cycle MHD power generating system utilizing the present invention.

In the drawing, there is illustrated in block diagram form an MHD coal preheating system in which pulverized coal from a pressurized hopper 10 or the like is continuously introduced into a loosely packed or fluidized coal bed 11, which may be essentially a vertically disposed cylindrical container. Thereafter, the coal suspended in a carrier is supplied to a combustion chamber or burner 12 where it is burned, the products of combustion resulting therefrom being supplied to an MHD generator 13. Seed and combustion air are introduced into the burner in conventional manner as shown. The effluent from the MHD generator 13 is supplied to and passes through a heat exchanger or regenerator 14 and is exhausted therefrom. Forming part of the system is a conventional $N_2$-$O_2$ separator 15 for separating air to provide $N_2$ and $O_2$. At least part of the $N_2$ from the separator 15 is coupled to a pump 16 via a make-up valve 17. The $N_2$ from the pump 16 is first supplied to and heated in the regenerator 14 and then as a heat exchange gas passed through the pulverized coal in the coal bed 11 where the pulverized coal is heated to the desired temperature by the hot $N_2$. The separator 15 is of conventional configuration and of a size to provide sufficient $N_2$ to make up for the loss of $N_2$ to leakage in the coal bed and the like and to carry the heated pulverized coal to the burner 12. The $O_2$ produced by the separator is supplied to the burner 12 to achieve the highest possible flame temperature.

As will now be apparent, the present invention contemplates in an MHD generating system a separator adequate to make enough $N_2$ to carry pulverized coal required by the generating system from the coal bed to the burner and, in general, to maintain the level of $N_2$ necessary in the circulating loop which carries heat from the regenerator to the coal bed.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention as defined by the following claims.

I claim:
1. In combination in a power plant having a combustion chamber for producing and supplying high temperature plasma to an MHD generator, the combination comprising:
(a) a source of pulverized coal;
(b) separator means for separating air into nitrogen and oxygen;
(c) means for supplying said oxygen to said combustion chamber;
(d) regenerator means for receiving the effluent from said MHD generator and said nitrogen from said separator means for heating said nitrogen;
(e) pump means for continuously passing said nitrogen through said heat exchanger means whereby said nitrogen is heated; and
(f) fluidized coal bed means for receiving said pulverized coal and said heated nitrogen, said heated nitrogen being flowed through said coal bed means to fluidize said coal therein and supplying heated coal suspended in nitrogen to said combustion chamber.

2. The combination as defined in claim 1 and additionally including make-up valve means for continuously supplying from said separator means to said pump means nitrogen at least substantially equal to the $N_2$ supplied from said coal bed means to said combustion chamber and the $N_2$ lost due to leakage.

3. The combination as defined in claim 2 wherein said coal bed means has a top portion and a bottom portion, said coal being supplied thereto at said top portion and removed from said bottom portion.

4. The combination as defined in claim 3 wherein said heated nitrogen is supplied to said coal bed means and said bottom portion and said nitrogen is exhausted from said top portion and coupled to said pump means for return to said regenerator.

References Cited

UNITED STATES PATENTS

| | | | |
|---|---|---|---|
| 3,229,651 | 1/1966 | Wasp | 110—7 |
| 3,264,501 | 8/1966 | Kantrowitz | 310—11 |

DAVID X. SLINEY, Primary Examiner

U.S. Cl. X.R.

110—28